United States Patent [19]

Boucher

[11] Patent Number: 4,570,534

[45] Date of Patent: Feb. 18, 1986

[54] REDUCED ALCOHOL WINE AND ITS MANUFACTURE

[75] Inventor: Armand Boucher, Stamford, Conn.

[73] Assignee: Joseph E. Seagram & Sons, Inc., New York, N.Y.

[21] Appl. No.: 445,064

[22] Filed: Nov. 29, 1982

Related U.S. Application Data

[63] Continuation-in-part of Ser. No. 341,363, Jan. 21, 1982, Pat. No. 4,405,652.

[51] Int. Cl.[4] .............................................. C12F 1/00
[52] U.S. Cl. ...................................... 99/277; 426/494
[58] Field of Search .............. 99/275, 276, 277, 277.1, 99/277.2, 278, 485; 426/494, 495, 493, 592, 14, 15, 492; 203/89

[56] References Cited

U.S. PATENT DOCUMENTS

| | | | |
|---|---|---|---|
| 1,800,940 | 4/1931 | Heuser | 426/493 |
| 2,734,023 | 2/1956 | Hickman | 203/89 |
| 3,052,546 | 9/1962 | Riddell | 426/15 |
| 3,200,050 | 8/1965 | Hogan | 203/89 |

FOREIGN PATENT DOCUMENTS

| | | |
|---|---|---|
| 44524 | 7/1981 | European Pat. Off. |
| 2076852 | 12/1981 | United Kingdom |

Primary Examiner—Robert W. Jenkins
Attorney, Agent, or Firm—Kane, Dalsimer, Kane, Sullivan and Kurucz

[57] ABSTRACT

A system and method of reducing the alcohol content of wine by exposing an original wine product to an elevated temperature in a centrifugal film evaporator and removing therefrom a liquid phase reduced alcohol wine and a vapor phase of relatively high proof. The original wine product is added to the reduced alcohol wine in predetermined ratio to increase the alcohol content and introduced desired properties and characteristics. The vapor phase is passed through a distillation unit and step to increase the alcohol content of the vapor phase.

12 Claims, 6 Drawing Figures

REDUCED ALCOHOL WINE AND ITS MANUFACTURE

REFERENCE TO RELATED APPLICATION

This application is a continuation-in-part of commonly assigned U.S. application Ser. No. 341,363 filed on Jan. 21, 1982 entitled Reduced Alcohol Wine And Its Manufacture, now U.S. Pat. No. 4,405,652.

BACKGROUND OF THE INVENTION

While the disclosure of the above-referenced parent application relates to a commercially successful and consumer acceptable reduced alcohol beverage and wine product as well as a method and system for its manufacture, it remains a continuing desire to upgrade and improve the quality of such products as well as the other by-products of the method and system.

SUMMARY OF THE INVENTION

A principal object of the present invention is to preserve and maintain the objectives sought and attained by the invention of the above-referenced parent application while upgrading and improving the quality of the reduced alcohol beverage and wine product disclosed therein as well as consumer acceptance of such products.

A further object is to raise the alcohol strength of the condensed high proof vapor phase produced by the method and system of the invention to thereby permit direct application of this by-product to brandy production.

Another object is to improve the shelf life of the reduced alcohol beverage and wine product.

Still another object is to provide a method and system for producing the products in accordance with the foregoing objectives.

Other objects and advantages will become apparent from the following detailed description which is to be taken in conjunction with the accompanying drawings.

DETAILED DESCRIPTION OF THE PREFERRED EMBODIMENT

Figure 1:
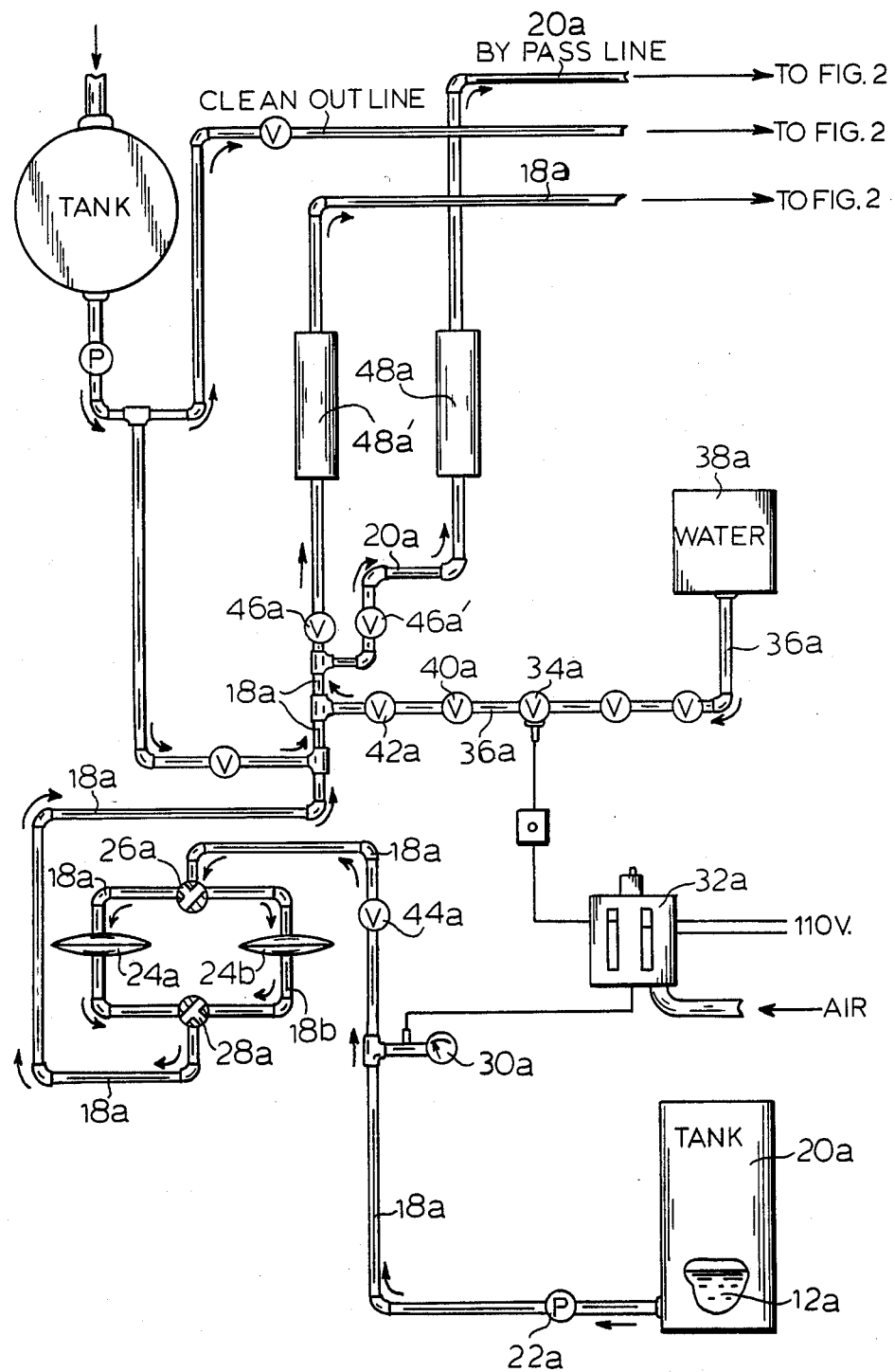
FIGS. 1 to 4 when placed side-by-side schematically illustrates one embodiment of the system of this invention for reducing the alcohol content of original wine.
Figure 2:
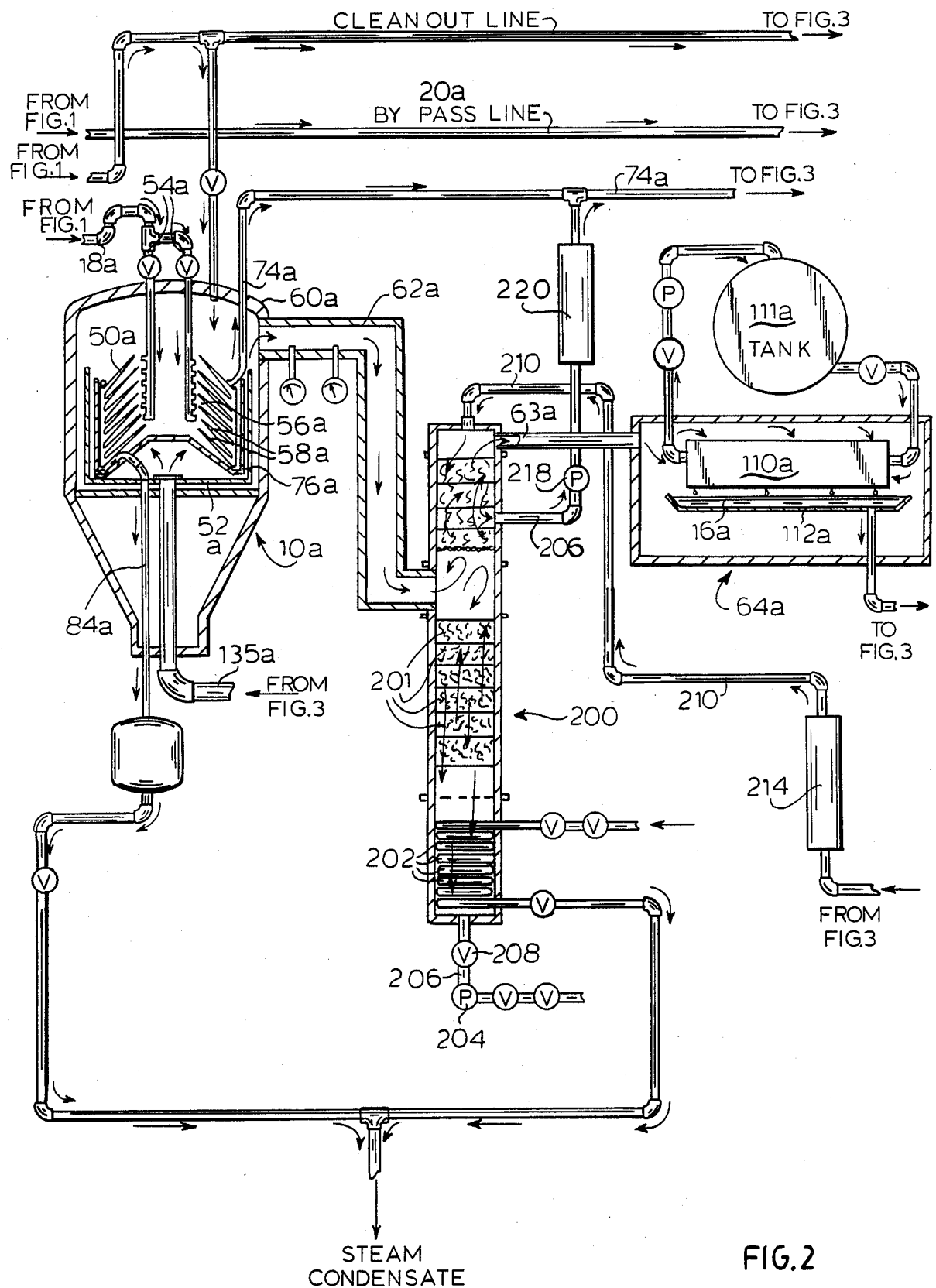
Figure 3:
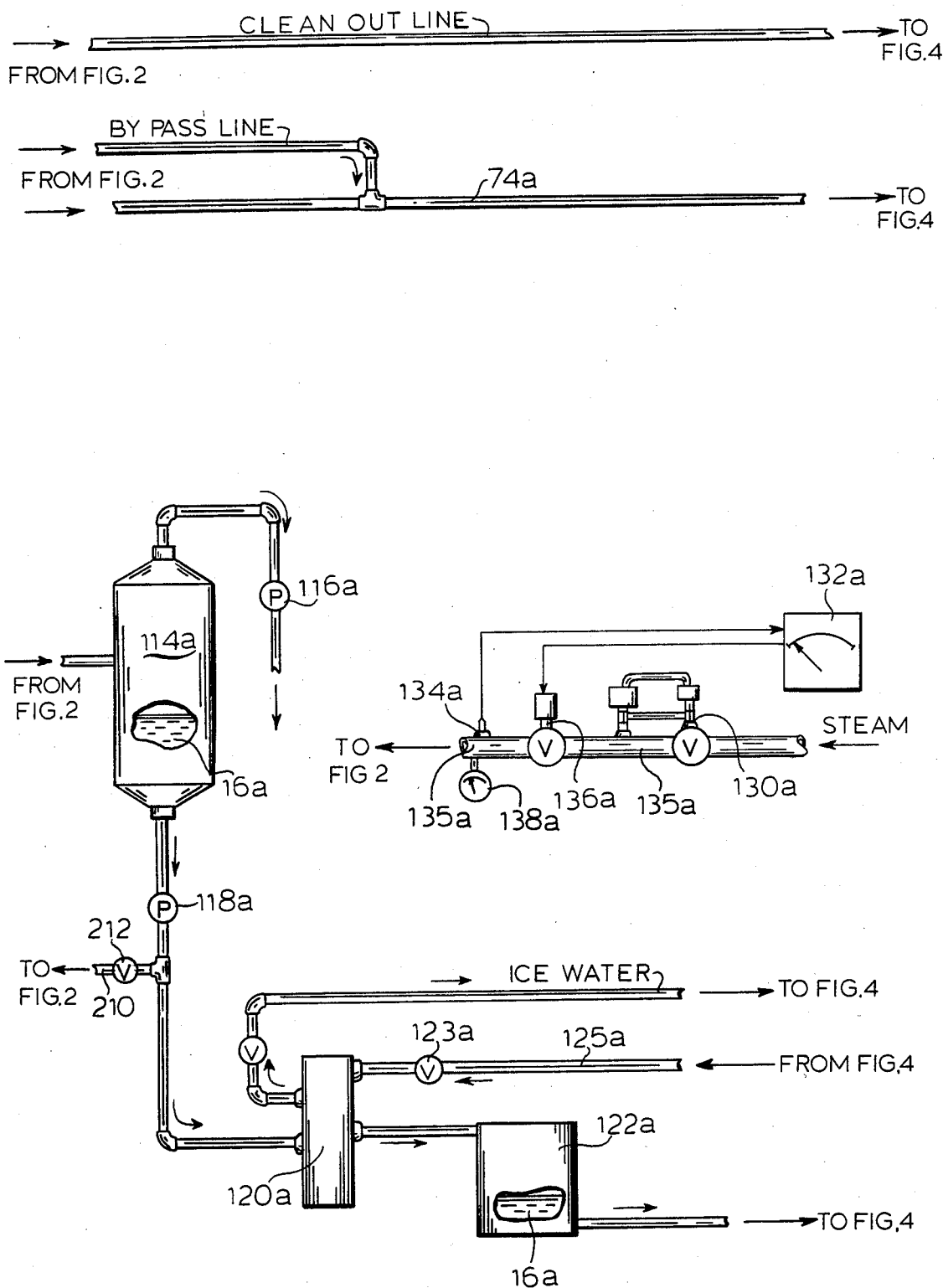
Figure 4:
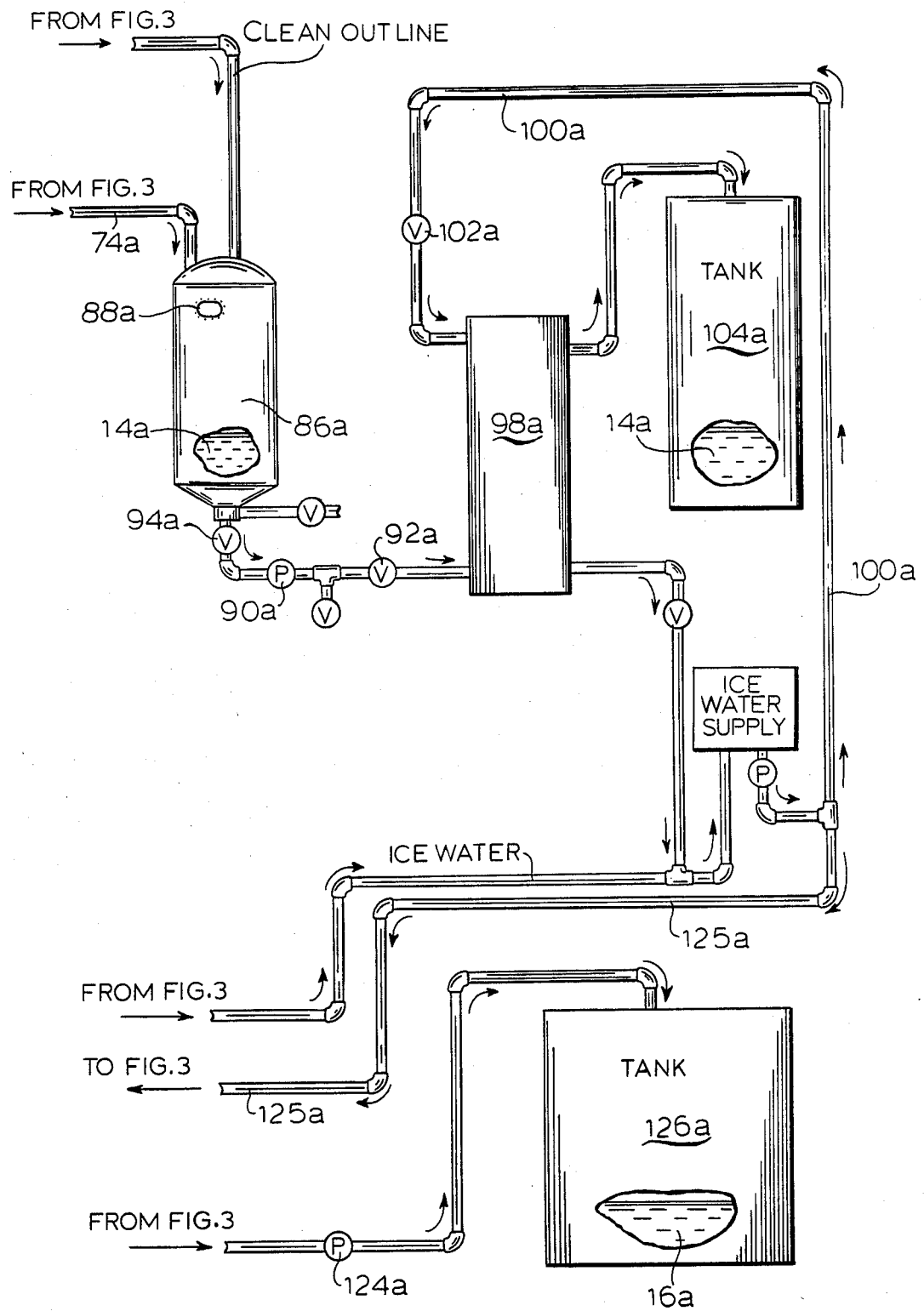

Referring initially to FIGS. 1, 2, 3, and 4 (these figures are to placed side-by-side as indicated), an embodiment of the invention is illustrated in which the alcohol content of the vapor by-product will be dramatically increased and the quality and shelf life of the reduced alcohol wine improved. Parts of the system corresponding with those disclosed in the parent application, will be similarly numbered but with an accompanying subscript a. Towards this end, a centrifugal film evaporator 10a advantageously cooperates in reducing an original wine product 12a into a liquid phase which is a reduced alcohol wine 14a achieving the objectives of this invention and a vapor phase which is a higher proof vapor by-product 16a. Once again, for purposes of explanation of the present embodiment and for exemplary purposes, the original feed wine product 12a will be a wine at 12% alcohol, the reduced alcohol wine 14a will be a wine at 7% alcohol and the vapor by-product 16a will be high proof at 75% alcohol.

The original feed wine inlet or line 18a connects with an original wine tank 20a which may be of any desired capacity, and as in the embodiment of the parent application eventually connects with a feed pump 22a. The feed line 18a includes two screen filters 24a and 24b in bifurcated lines 18a and 18b, respectively. Three-way valves 26a and 28a permits one of the lines 18a to be closed so that it can be cleaned. A gauge 30a indicates the pressure of the wine going through the feed line 18a. A control device 32a is coupled with solenoid valve 34a, which when actuated is adapted to cut off pump 22a, and, consequently, the feed of wine 12a.

The solenoid valve 34a is in a water supply line 36a connected with a valve controlled source of supply 38a of water. Water is introduced into the system and particularly line 18a to prevent wine from depositing and solidifying on the internal parts of the evaporator 10a when the original wine feed is stopped. Otherwise, the entire system must be stopped in order to clean the interior of the evaporator 10a. Valve 40a adjusts the rate of feed of water and check valve 42a prevents wine in line 18a from entering line 36a. Similarly, check valve 44a prevents water from mixing with the wine beyond this location in wine line 18a. A manual control valve 46a controls the rate of feed of wine in line 18a. The wine from the rotometer 48a is directed into the evaporator 10a. In a successful application of this embodiment a flow of 0-3 liters/minute into the evaporator was utilized. Feedline 20a branches off through another manual control valve 46a' into a second rotometer 48a' and is coupled with the low alcohol wine product discharged from the evaporator 10a. The feed of wine through rotometer 48a' in this discussed application was 0-1 liters/minute. As shown a valve controlled system cleanant network may also be included for purposes of passing either water or an appropriate cleaning solution through the system.

The evaporator 10a may also be obtained commercially from Alfa-Laval AB, Lund, Sweden, and utilizes indirect heat exchange with thin-layer liquid flow and centrifugal separation. The heating surfaces consist of a nesting stack of hollow conical discs 50a rotating on a motor driven common spindle 52a. The heat is provided by steam fed internally of the discs in a manner to be described shortly.

The original feed wine 12a enters through the stationary distributor pipe 54a in the opened central column and is sprayed through nozzles 56a onto the underside 58a of the rotating conical discs 50a, where centrifugal forces immediately spreads it over this entire surface. This layer will be no more than 0.1 mm (0.004 inches) thick, and transit time from inner to outer edges will be approximately 1 second. Contact with the steam heated surface results in instant vapor formation of the lower boiling point and lower heat of vaporization compounds; the vapor escapes easily from the thin liquid layer and rises through the open central column of the evaporator 10a into the surrounding shell 60a from which it is drawn off through the outlet 62a as a mixture predominately of alcohol and water to the column 200, which converts this vapor phase into the high proof by-product 16a. The mixture ranges from from 36 to 47% alcohol normally being about 42% for chablis and about 47% for rose. The higher proof by-product 16a according to this invention will be well above 75% alcohol.

In the evaporator 10a the alcohol wine collects against inner wall of the rims of the conical discs 50a. The wine travels up vertical openings leading to a paring channel at the top, where the light wine is ducted off by a stationary paring tube into line 74a. This reduced alcohol wine, in a successful application was at 5% alcohol content.

Steam is admitted through the hollow spindle 52a through the jacket 76a surrounding the stack of conical discs 50a and vents through holes into the disc interior, where it is condensed by the wine passing on the underside 58a. As soon as the condensate droplets form, they are flung by centrifugal force to the upper inside surface of the conical discs 50a and travel down this surface, escaping back into the steam jacket 76a through the same holes by which the primary steam entered. The condensate runs down the walls of the steam jacket 76a to the paring channel 82a at the bottom, from which it is removed by a stationary paring tube 84a mounted inside the hollow spindle 52a. In order to prevent wine deposit on the upper cone face from solidifying by dehydration, this face is insulated from the heat of steam condensate. In the commercial form of evaporator 10a, the upper wall of cone 50a is a double separated wall providing insulation to the upper cone surface.

In accordance with a successful embodiment of this invention, the reduced alcohol wine is mixed in a certain ratio with the original wine product 12a to provide wine 14a at 7% alcohol. It has been determined that this mixture provides a significant quality improvement by introducing back into the reduced alcohol wine some of the original feed wine bouquet and flavor. In addition, there was a prounounced improvement in mouth feel, ie, more residual taste properties.

This pump 90a pulls a vacuum sufficient in order to permit the reduced alcohol wine to leave the evaporator 10a through the paring tube 74a to join with original wine 12a to form the reduced alcohol in 14a fed into the receiver 86a. A check valve 92a is on the upstream side of pump 90 to avoid vacuum loss.

Referring now to the vapor phase system, the vapor phase is exposed to a rectifying action within the column 200. Towards this end, the column 200 includes a plurality of sections 201 of distillation mesh packing material preferably having relatively large opening volume and therefore low pressure drop. A satisfactory material for the sections is wire mesh packing sold under the name Hyperfil marketed by Chem-Pro Equipment Corporation, Fairfield, New Jersey. At the base of the column 200 is valve controlled coiled copper tubing 202 through which steam passes for boil-up which is variable and in the discussed application was about 50,000 BTU/hr.+ A variable speed pump 204 drains off the collected water through line 206 which may include an adjustment valve 208 as well as other shut-off valves if desired.

The higher proof vapor product (75% alcohol) is condensed in condenser 64a then drawn into separator 114a by main vacuum pump 116a. Pump 118a may feed the high proof by-product 16a to a condenser or cooler 120a and then to storage tank 122a. The cooler 120a receives ice water through line 125a having valve 123a which may be pumped by pump 128a which may also supply coolant for line 100a.

A reflux return line 210 controlled by adjustable valve 212 and having a rotometer 214 feeds the higher proof by-product back to the top of the column 200 to facilitate the distillation process. In the discussed application this feed rate was 0–2 liters/minute.

Where it may prove desirable, and as contemplated by this invention, the column 200 may be tapped at 206 to a direct part selected or parts or fractions of the higher proof by-product back into the low alcohol wine paring tube line 74a. A pump 218 and rotometer 220 may be in this tap line to faciliate this feed. In this manner, any desired fraction removed from the original feed wine may be introduced back into the reduced alcohol wine. For example, esters which contribute to bouquet, and/or certain of the higher alochols which contribute to mouth feel may be introduced. In another successful application the reduced alcohol wine from evaporator 10a was at 5% alcohol, the amount of original feed wine increased the alcohol content 1% and the tapped vapor condensation increased the alcohol content to 7%.

Reference is now made to the steam supply system for the evaporator 10a. In the discussed embodiment, steam at a prescribed pressure passes through pressure reducer 130a. A control device 132a for the steam supply system monitors the pressure in the steam line through the coupled sensor 134a. If the pressure exceeds a predetermined limit or should there be a failure in the steam supply system a solenoid valve 136a cuts off the system. A gauge 138a may be deployed for indicating steam temperature.

Operation of the process of this invention is at very high vacuum conditions. The timing contact of the feed wine 12a with the heat transfer surface 58a is less than 1 second; and, therefore, in effect, no molecular decomposition or transformation takes place due to chemical reaction.

Those skilled in the art readily appreciate that wine is a highly complex mixture of ingredients, the blend of which account for its unique taste or flavor characteristics. The major proportion of wine is of course made up of water and ethyl alcohol. In addition, one generally expects to find organic and inorganic compounds such as Sugars like
   glucose, fructose, pentoses;
Alcohols such as
   glycerol, 2, 3-butanediol, acetoin amyl, isobutyle and n-propyl alcohols;
Esters such as
   ethyl acetate, ethyl succinate, ethyl lactate;
Acids such as
   tartaric, malic, citric, succinic, latic and acetic acids;
Minerals such as
   sodium, potassium, calcium, iron, phosphorus, sulfur and copper;
Nitrogenous substances such as
   ammonia, amino acids and proteins;
Acetaldehyde;
Phenolic substances;
Color pigments and
Vitamins in a minor proportion. Many of these organic and inorganic compounds, alone or in combination, give characteristic taste and flavor to the wine.

It is expected that some of the more volatile of these flavoring compounds making up the minor proportion of wine will be removed with the higher proof by-product during the process of the invention. Aldehydes ace and als esters and some higher alcohols are some of the volative compounds reduced and/or removed. It is noteworthy, however, that the loss of the volatile higher alcohols such as the aliphatic alcohols does not adversely affect the desired taste characteristics of the wine. In fact, removal of aldehydes-acetates and propyl alcohol are beneficial to the taste of the product wine. In dropping the wine by-product to a lower alcohol content, such as 5%, as compared to that obtained in the parent application, the wine would have a fraction of higher amyl alcohol, lower n-propyl and lower volatile esters, acetals and aldehydes. Even though amyl alcohol is not beneficial to taste its presence does contribute to mouth feel considered to be essential to light wine. Thus, the present invention reduces the amyl alcohol level to improve taste but keeps it at a level to provide mouth feel. Removal and/or reduction of aldehydes, acetates and n propyl would improve the shelf life of low alcohol wine products.

Figure 5:
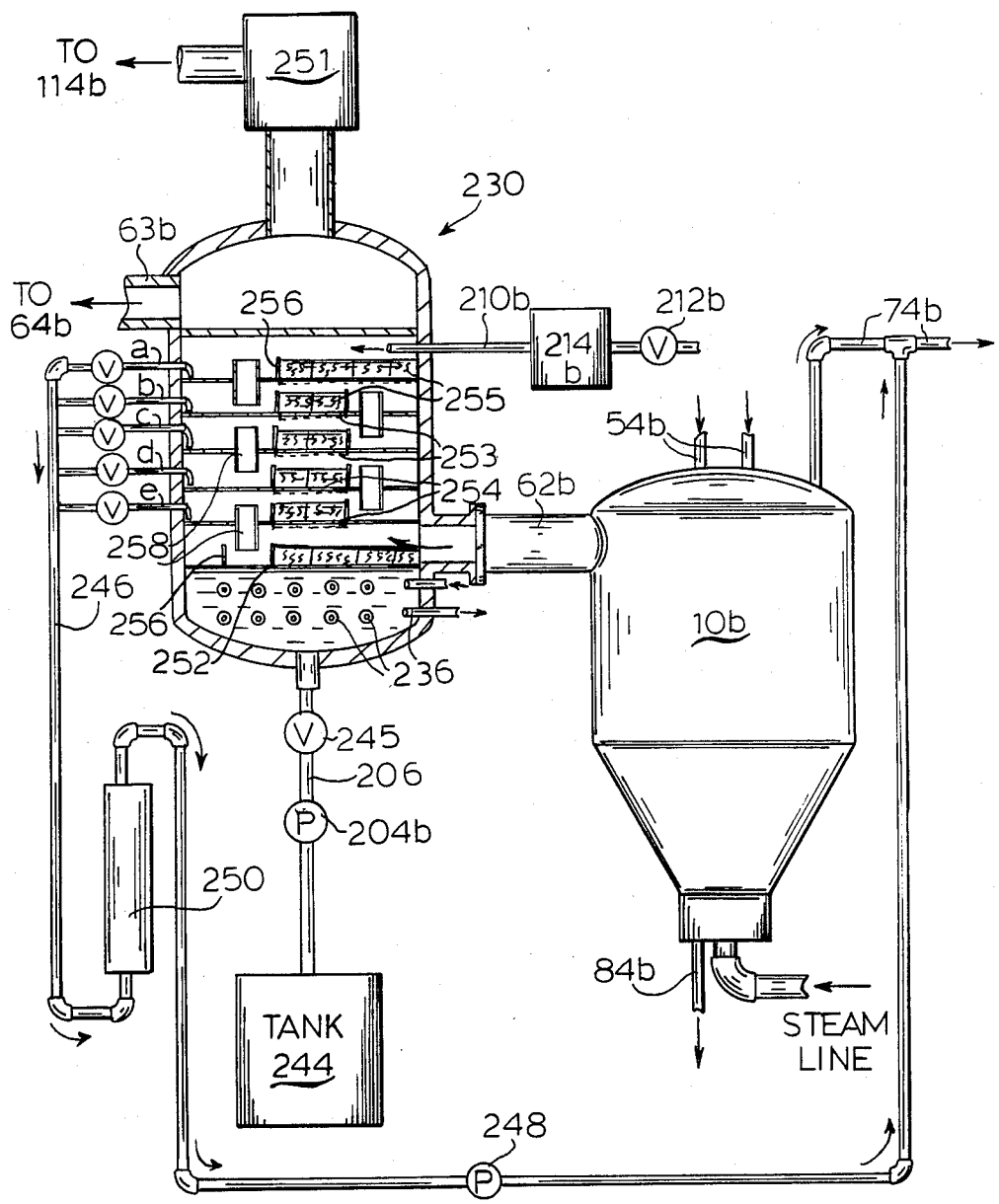
FIG. 5 schematically illustrates a part of a second embodiment of the invention.

Referring now to FIG. 5, an alternative embodiment is illustrated for receiving the higher proof by-product from the evaporator 10b and increasing its alcohol contents to a much higher level while also improving the quality of the reduced alcohol wine. In general terms, a cascade unit 230 is interposed between the evaporator 10b and condenser 64b of the system disclosed in the parent application. Thus, corresponding parts will be similarly numbered with an accompanying subscript b. As in the previous embodiment the low alcohol wine product leaving the separator 10b will be at approximately 5% alcohol content which will then be mixed with a part of the original feed wine to provide the 7% low alcohol wine product for the consumer. The cascade unit 230 will receive the high proof vapor by-product from the separator 10b through the coupling 62b and thereafter transfer the higher proof vapor by-product to the condenser 64b via the coupling 63b. Coils of copper tubing 236 at the base of the cascade unit 230 carry steam for providing heat within the cascade unit. The variable speed pump 204b draws off the collected water and alcohol as tails 244(strength 10–30%) through line 206 which may be valve controlled, to a selected destination such as the illustrated tank. The tails could be used to increase the acidity and the cuvee in the manufacture of American champagnes which are generally run low on acids. Valve 245 may serve as a level control. The vapor by-product at about 80% alcohol content then passes from the cascade unit 230 for cooling by condenser 64b as discussed in the previous embodiment. The higher proof by-product 16b before cooling is fed as reflux through rotometer 214b and valve control 212 and after cooling to storage as in the previous embodiment. In accordance with a successful embodiment of the invention the higher proof vapor by-product was at 80% alcohol content. A reflux return line 210b controlled by adjustable valve 212b and having a rotometer 214b feeds the higher proof by-product back to the top plate unit 230. In a successful embodiment of the invention the reflux feed was at 0–200 gallons per hour. The efficiency of the seive column unit operation as well as the column unit is enhanced by providing a ½ to 3 to 1 reflux ratio.

As is the case with the embodiments of FIGS. 1–4, the unit 230 may be tapped at 246a–e to direct part or certain selected fractions of the higher proof by-product back into the low alcohol feed line which coupled with a paring tube 74b. A pump 248 and the rotometer 250 may be in this tapped line.

At the top of the cascade unit 230 is a tap for directing the volatile esters in particular to condenser 251 which are then directed to the separator 114b. Deflector plate 252 prevents the liquid from boiling up too rapidly and violently. In the unit 230 liquid level is maintained on the plates 253 to the height of the overflow weir 256 to maintain a liquid level on the plate for vapor liquid exchange. The plates 253 are perforated with 3/16" holes between these weirs 256 and on these perforated zones may rest a mesh cloth or screen 254 (150 mesh S.S. cloths in a successful application). This mesh cloth 254 enhances liquid on the plate 253 so that the liquid traverses the plate 253 and not weep or flow through the plate perforations. A demister 255 in the form of woven packing material is deployed to reform liquid droplets above the mesh screen 254 and thus avoids impact on the plate above. The bottom down comber 258 has a sealed cup 260 to prevent vapors going up through the down comber.

Figure 6:
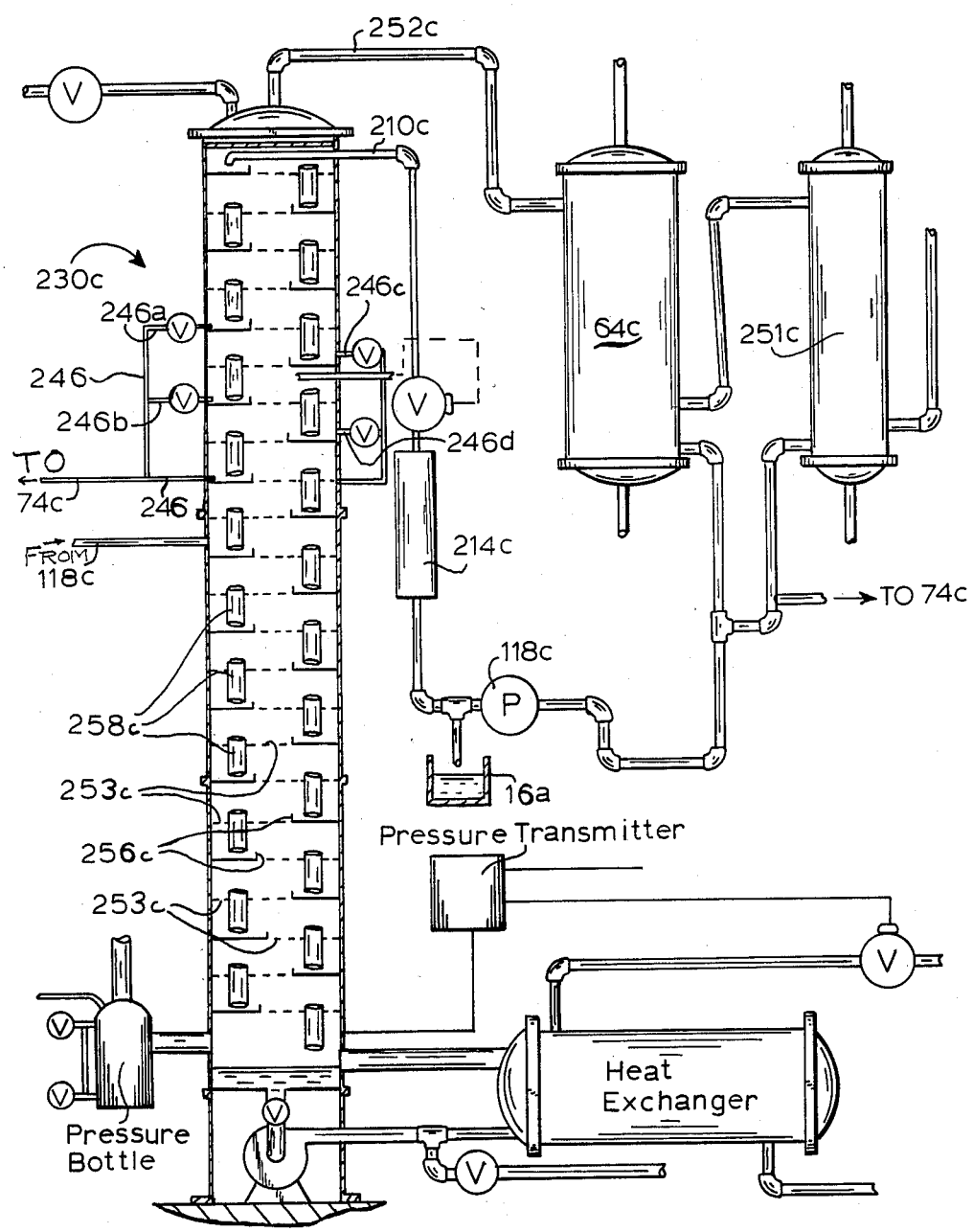
FIG. 6 schematically illustrates a part of a third embodiment of the invention.

The system of FIG. 6 is similar to FIGS. 1, 2, 3 and 4, except that unit 200 is replaced by a unit 230c called distillation column, which includes a stripping section similar to FIG. 200 (FIG. 5 does not have a stripping section). The attractive thing about the unit 230c is that one can draw off at any one of the plates to get the higher alcohols or esters desired to be introduced back into the reduced alcohol wine.

The vapor phase from the evaporator 10c goes directly to the condenser 64c. The product from the condenser 64c is fed to the tank 114c and through pump 118c which pumps the product to the unit 230c. The unit 230c may be similar to the unit 230, but is provided with more sections and more plates. In a specific application, 24 plates were employed in unit 230c as compared to 4 plates in unit 230, fourteen of which were stripping plates to reduce the alcohol to zero. Ten of these plates were employed as rectifying plates giving the capability of higher alochol and selective esteer separation as well to produce a brandy having in excess 80% alochol.

The process according to the embodiment of FIG. 6 will now be described. The vapors derive from the evaporator 10c and the heat supplied to that unit, which is operating under a high vacuum, course through the column 230c operating as a still. The vapors condense on the perforated plate openings 253c and drop on the liquid held on the plate 253c of each section which is provided for by the reflux feed 210c to the top plate of the column 230c. This feed is current cross-flowed on the plates 253c and held to a liquid level by the weir 256c attached to each plate 253c. Liquid overflows the weir 256c into the down comber 258c to the successive plate 253c below also engaging the vapors which are rising in the still column 230c. The liquid comes out of the bottom of the down comber 258c and overflows the weir 256c on that plate 253c and cross-flows the plate to the next down comber 258c which leads to the plate below. Again the liquid overflows the weir 256c down the down comber 258c to the lower plate 253c. This is a repeatable process depending on the number of sections in the column 230c. The heat derived from the vapor coming from the evaporator 10c is augmented by the reboiler or heat exchanger at the base of the column 230c to add enough heat to cause a boil up of the reflux 210c which is coming in as a cold liquid. The heat of vaporization is enriched by the alcohol water mixture coming in as reflux based on the amount of reflux provided to the distilling section. In this connection, alcohol has a lower boiling point and a lower heat of vaporization. As a result of this lower heat of vaporization and each time the liquid is condensed on the plate 253c, it gives its heat to that liquid cross-flowing the plate and more alcohol is in the vapor state than there is water. Thus, this system raises the strength from approximately 40 to 45% alcohol as a vapor from the evaporator 20c up to 84–86% alcohol by volume as vapors derive from the top of the column 230c. This is a result of the enhancement by the reflux 210c and based on the so-called reflux ratio which is a volume of reflux in gallons related to the through put in the column 230c of the vapors derived from the evaporator 10c. The capability of the reflux 210c to function is based on the additional heat input at the reboiler or heat exchanger at the base of the column 230c.

Provisions may be made on each of the plate sections to draw liquid product to enhance the aromatic level of the light wine and these liquid draws are at each plate behind the weir to achieve its liquid separation with the capability of that liquid to be added back to the reduced alcohol wine. The concentration of each draw is high enough that a very small volume is required to achieve flavor enhancement and aromatic enhancement or a better bouquet to the finished product.

The esters and the higher alcohols being much lower boiling constituents would be the vapors going through tube 252c. An outlet tube of condenser 64c permits vapor to be tapped off to a condenser 251c, which is designed primarily to capture the esters.

The higher proof vapor by-product 16a, 16b and 16c at 75% and 80% alcohol content (by definition this is considered a brandy in France) may then be utilized in producing brandy. Under these circumstances, this higher proof product will be placed in used oak barrels for maturation.

Thus, the embodiment of FIGS. 1–4 and FIGS. 5 and 6 effectively raises the alcohol strength of vapor by-product 16a–16b anywhere from 75% to 80%. The tapping off of the various fractions of the vapor condensate has resulted in significant quality improvements in mouth feel. In this regard, while amyl alcohol is added back for this purpose, the resultant amount is still less than that contained in the original wine. The above embodiments improve the quality of the end product and, this is accomplished by the reintroduction of a certain reduced percentage of the higher alcohols and the esters back into the reduced alcohol wine. The location of the tap for the column and the unit 230 will permit the extraction of a product richer in amyl alcohol and lower in n-propyl. In the embodiment of the present invention, the fraction obtained and desired for the low alcohol wine product 14a–14b is higher amyl alcohol, lower n-propyl and lower volatile esters, acetals and aldehydes. This factor ie aldehyde reduction results in significant shelf life stability, particularly as a result of the reduction in these volatiles.

The following examples describe the manner and process of making and using the invention and set forth the best mode contemplated by the inventors of carrying out the invention but are not to be construed as limiting. In carrying out the examples the chemical analysis results reported were determined by gas chromatograph.

EXAMPLE I

Employing the apparatus described above and depicted in FIG. 5, a California white dinner wine (chablis) is treated according to the above described method of the invention. Chemical analysis of the original feed wine, and the reduced alcohol wine product of the invention is given as follows:

|  | Original Feed Wine 12b | Alcohol Reduced Wine 14b | Distillate 16B |
| --- | --- | --- | --- |
| Alc by volume | 11.7 | 7.0 | 79.3 |
| pH | 3.7 | 3.6 | 4.0 |
| Copper PPM | 0.18 | 0.28 | 0.17 |
| Iron PPM | 3.50 | 5.10 | 0.26 |
| Reducing Sugar % w/w | 1.2 | 1.4 | 0.0 |
| Free SO$_2$ | 34 | 35 | 0.0 |
| Total SO$_2$ PPM (ADAC) | 77 | 92 | 0.0 |
| Total SO$_2$ PPM (Ripper) | 117 | 131 | — |
| Grams/100 Liters |  |  |  |
| Total acids as tartaric | 678 | 684 | 25 |
| Total acids as acetic | 542 | 547 | 19 |
| Volatile acids as acetic | 63 | 68 | 9 |
| Ethyl acetate | 3.6 | 1.3 | 70.6 |
| Total higher alcohol | 24 | 11 | 252 |
| N—propyl | 5 | 3 | 46 |
| Isobutyl | 3 | 1 | 38 |
| Amyl | 17 | 7 | 159 |
| Acetaldehyde | 4.9 | 8.6 | N-D |
| Acetal | N-D | N-D | 1.0 |
| Furfural | 0.00 | 0.00 | 0.00 |

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A system of reducing the alcohol content of wine comprising:

a source of the original wine product;

an original wine product inlet line coupled with the source;

an original wine product feeding means for feeding an original wine product from the source through the original wine product inlet line;

a centrifugal film evaporator coupled with the original wine product inlet line for elevating the temperature of the original wine product while being centrifuged to a temperature at which a predetermined part thereof is divided into a liquid phase and a vapor phase, the liquid phase being a reduced alcohol wine and the vapor phase being a vaporized by-product of relatively high proof, the centrifugal film evaporator having means for removing the liquid phase by centrifugation and means for moving the vapor phase therefrom;

a bypass line coupled with the source of the original wine product for bypassing the evaporator with original wine product;

an outlet line extending from the evaporator for directing the liquid phase from the evaporator;

means connecting the bypass line and outlet line for mixing the liquid phase with the original wine product in a predetermined ratio;

distillation means coupled with the evaporator for receiving the vapor phase and for increasing the alcohol content of the vapor phase; and
a condenser being coupled with the distillation means for cooling and condensing the higher proof vapor phase and means for collecting the higher proof product.

2. A system of reducing the alcohol content of wine comprising:
a source of the original wine product;
an original wine product inlet line coupled with the source;
an original wine product feeding means for feeding an original wine product form the source through the original wine product inlet line;
a centrifugal film evaporator coupled with the original wine product inlet line for elevating the temperature of the original wine product while being centrifuged to a temperature at which a predetermined part thereof is divided into a liquid phase and a vapor phase, the liquid phase being a reduced alcohol wine and the vapor phase being a vaporized by-product of relatively high proof, the centrifugal film evaporator having means for removing the liquid phase by centrifugation and means for removing the vapor phase therefrom; and
distillation means coupled with the evaporator for receiving the vapor phase and for increasing the alcohol content of the vapor phase, the distillation means being a column having an interior and a base, sections in the interior of the column of wire mesh packing providing relatively low pressure drop thereby providing a low pressure drop distillation packing column.

3. The invention in accordance with claim 2, wherein heating means are provided at the base of the column for heating the interior of the column.

4. The invention in accordance with claim 3, wherein the heating means is provided by coil tubing having steam passing therethrough.

5. The invention in accordance with claim 2, wherein the base of the column includes means for removing condensed water separated from the vapor phase.

6. A system of reducing the alcohol content of wine comprising:
a source of the original wine product;
an original wine product inlet line coupled with the source;
an original wine product feeding means for feeding an original wine product form the source through the original wine product inlet line;
a centrifugal film evaporator coupled with the original wine product inlet line for elevating the temperature of the original wine product while being centrifuged to a temperature at which a predetermined part thereof is divided into a liquid phase and a vapor phase, the liquid phase being a reduced alcohol wine and the vapor phase being a vaporized by-product of relatively high proof, the centrifugal film evaporator having means for removing the liquid phase by centrifugation and means for removing the vapor phase therefrom; and
distillation means coupled with the evaporator for receiving the vapor phase and for increasing the alcohol content of the vapor phase, the distillation means being a cascade unit having an interior and a base, a plurality of spaced ones and interposed inverted conical baffles in the interior that define a tortuous path for the vapor phase.

7. The invention in accordance with claim 6, wherein heating means are provided at the base of the cascade unit for heating the interior thereof.

8. The invention in accordance with claim 6, wherein the heating means is provided by coil tubing having steam passing therethrough.

9. The invention in accordance with claim 6, wherein the base of the cascade unit includes means for removing condensed water separated from the vapor phase.

10. A system of reducing the alcohol content of wine comprising:
a source of the original wine product;
an original wine product inlet line coupled with the source;
an original wine product feeding means for feeding an original wine product form the source through the original wine product inlet line;
a centrifugal film evaporator coupled with the original wine product inlet line for elevating the temperature of the original wine product while being centrifuged to a temperature at which a predetermined part thereof is divided into a liquid phase and a vapor phase, the liquid phase being a reduced alcohol wine and the vapor phase being a vaporized by-product of relatively high proof, the centrifugal film evaporator having means for removing the liquid phase by centrifugation and means for removing the vapor phase therefrom; and
distillation means coupled with the evaporator for receiving the vapor phase and for increasing the alcohol content of the vapor phase;
a condenser being coupled with the distillation means for cooling and condensing the higher proof vapor phase and means for collecting the higher proof product; and
reflux means being provided for directing the condensed higher proof product back to the distillation means to facilitate the distillation of the vapor phase.

11. A system of reducing the alcohol content of wine comprising:
a source of the original wine product;
an original wine product inlet line coupled with the source;
an original wine product feeding means for feeding an original wine product form the source through the original wine product inlet line;
a centrifugal film evaporator coupled with the original wine product inlet line for elevating the temperature of the original wine product while being centrifuged to a temperature at which a predetermined part thereof is divided into a liquid phase and a vapor phase, the liquid phase being a reduced alcohol wine and the vapor phase being a vaporized by-product of relatively high proof, the centrifugal film evaporator having means for removing the liquid phase by centrifugation and means for removing the vapor phase therefrom; and
distillation means coupled with the evaporator for receiving the vapor phase and for increasing the alcohol content of the vapor phase, a line is coupled with the evaporator to direct the reduced alcohol wine away from the evaporator, the distillation means including a tap at a predetermined location thereon and coupling means between the tap and the reduced alcohol wine line for introducing predetermined fractions of the vapor phase within the distillation means back into the reduced alcohol wine.

12. The invention in accordance with claim 11, includes means for mixing the liquid phase with the original wine product in a predetermined ratio.

* * * * *